May 19, 1970  H. J. QUALHEIM  3,513,273

MAGNETICALLY-CONTROLLED SAFETY SWITCH FOR FOOD SLICERS

Filed Sept. 19, 1968  2 Sheets-Sheet 1

INVENTOR
HAROLD J. QUALHEIM
BY
Axel H. Johnson
AGT.

May 19, 1970     H. J. QUALHEIM     3,513,273

MAGNETICALLY-CONTROLLED SAFETY SWITCH FOR FOOD SLICERS

Filed Sept. 19, 1968     2 Sheets-Sheet 2

INVENTOR
HAROLD J. QUALHEIM

BY

Axel H. Johnson
AGT.

United States Patent Office 3,513,273
Patented May 19, 1970

3,513,273
MAGNETICALLY-CONTROLLED SAFETY SWITCH FOR FOOD SLICERS
Harold J. Qualheim, 111 S. Vincennes Circle, Racine, Wis. 53402
Filed Sept. 19, 1968, Ser. No. 760,772
Int. Cl. H01h *3/16*
U.S. Cl. 200—61.62    1 Claim

ABSTRACT OF THE DISCLOSURE

A means of controlling the motor circuit of a food slicer. The slicer has a magnet mounted in the cover thereof, and a switch is positioned in the frame. When the cover is closed, the magnetic field of the magnet actuates the switch to close the motor circuit. When the cover is opened the magnetic field is withdrawn, permitting the switch to open and interrupt the circuit.

BACKGROUND OF THE INVENTION

Field of the invention

This invention concerns a safety switch to control the motor of food slicers.

Description of the prior art

Prior art switches for this purpose usually comprise a spring-loaded plunger which is engaged by a cover to close the circuit. When the cover is opened, the plunger is released, thereby opening the circuit. One prior art example of a similar switch is that shown in the patent to Narcum 3,216,472.

SUMMARY

This invention comprises a normally-open switch having a magnetically-attracted pad. The switch is mounted in the frame of the slicer. The hinged cover of the machine is provided with a magnet. When the cover is closed, the field of the magnet attracts the pad and closes the circuit to permit the motor to operate. When the cover is opened, the magnetic field is withdrawn, permitting the switch to open and break the circuit. Similar devices in the prior art comprise spring-influenced plungers which actuate a switch upon the closing of a door or cover. Such plungers are exposed and unsatisfactory for use with food slicers in that the juices of the vegetables being sliced may interfere with the free movement of the plunger and cause erratic operation of the slicer.

An object of this invention is to provide a safety switch for food slicers which is positive in action.

Another object is to provide a means of making and breaking the motor circuit of a food slicer which is protected from contamination by food juices produced during the process.

Another object is to provide a safety switch that has all elements thereof enclosed in order to prevent unauthorized tampering.

A preferred embodiment of the invention is shown in the accompanying drawings forming a part of the specification wherein.

Figure 4:
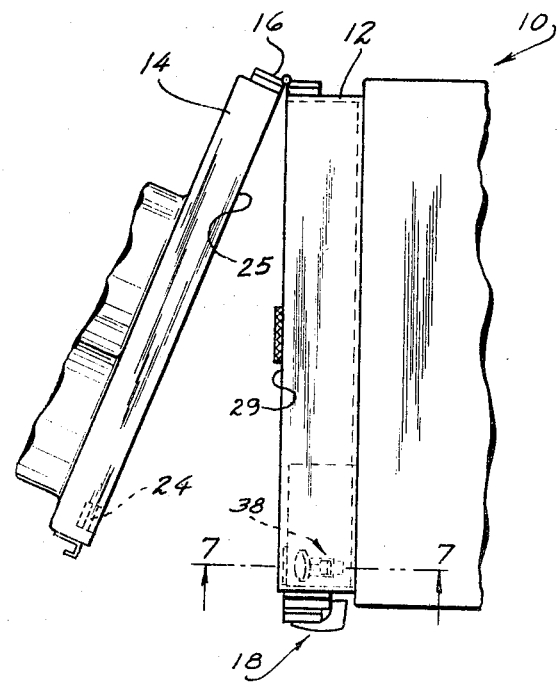
FIG. 4 is a plan view with the cover open.
Figure 3:
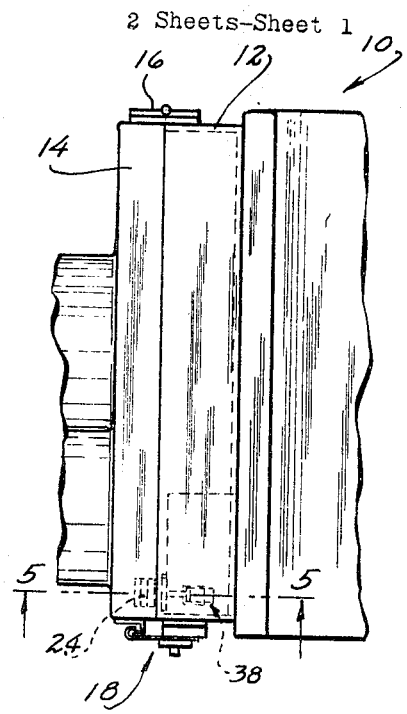
FIG. 3 is a plan view of the slicer of FIG. 1.

Referring to the drawings in detail; a typical food slicer incorporating this invention, comprises a housing 10 having a frame 12 of non-magnetic material to which a cover 14, also of non-magnetic material, is hinged as by hinges 16. A latch 18 is provided to secure cover 14 in contact with frame 12 when the slicer is being used. Housing 10 encloses a suitable motor M, shown in FIG. 5, which rotates a rotor 20 having a slicer blade 22 affixed thereto. Rotor 20 is rotated in the direction of arrows 21 of FIG. 2. Rotor 20 is adjustable axially to permit slicing vegetables and other food products to various thicknesses.

Figure 2:
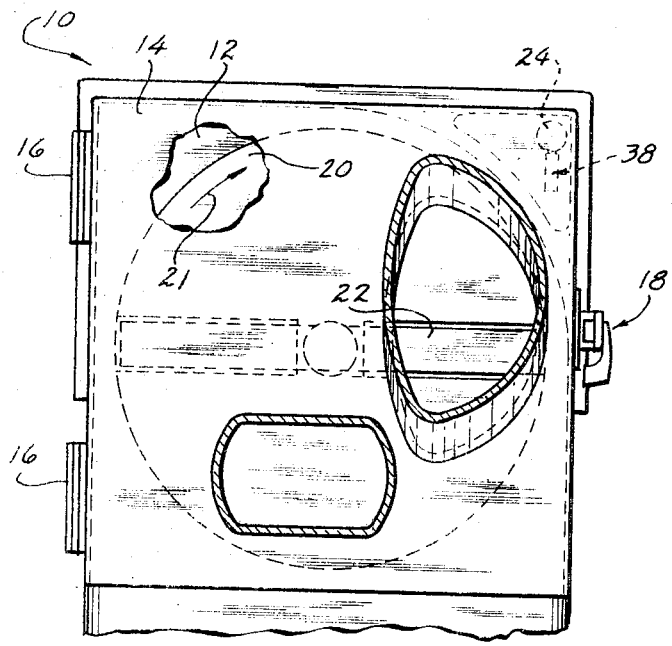
FIG. 2 is a front view of the slicer of FIG. 1.
Figure 1:
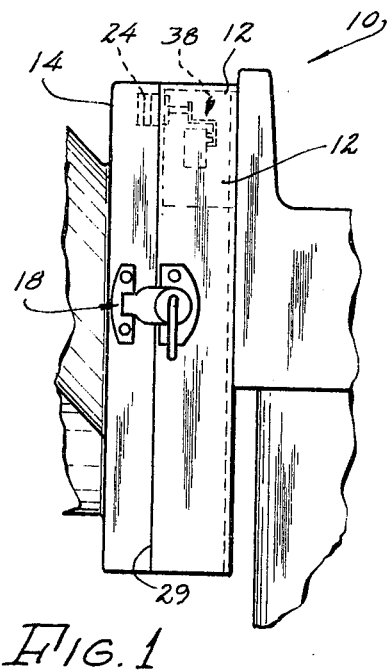
FIG. 1 is a fragmentary elevational side view of a typical food slicer embracing the invention, with portions broken away.

One or more co-axial magnets 24 are inserted in a counterbore 26 produced in the front surface 25 of cover 14, in the corner thereof as shown in FIG. 2. The number of magnets needed depend upon the strength of the magnetic field produced and which should be sufficient to positively actuate the switch when the cover 14 is closed. The exposed magnet 24 is co-planar with front surface 25 of cover 14.

Frame 12 comprises a front wall 28 having a front face 29. A counterbored recess 30 is provided as shown on the rear face of wall 28 and in close proximity to the edge of frame 12, and which counter-bore is co-axial with counterbore 26 when cover 14 is closed, and of the depth shown, leaving the front face 29 of wall 28 unapertured. A mounting pad 32 is integral with wall 28 and supports a switch bracket 34 by means of suitable screws 36.

Figure 6:
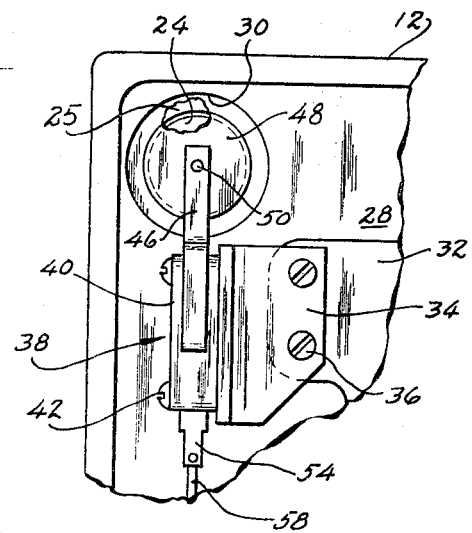
FIG. 6 is a view taken at 6—6 of FIG. 5.
Figure 7:
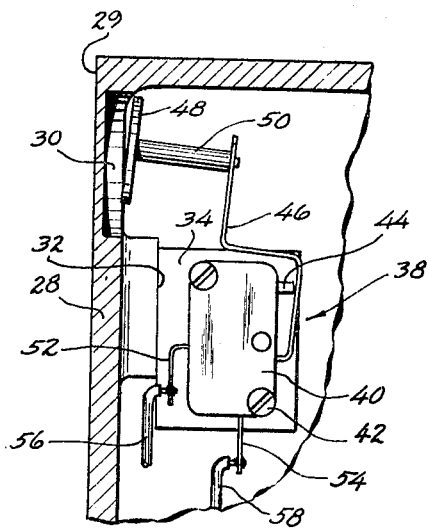
FIG. 7 is a view taken at 7—7 of FIG. 4, and showing the switch in the open position and with the circuit broken.

A switch 38 of the type known as a "Microswitch," is employed in this instance, and has a body 40 mounted upon bracket 34 by screws 42. Body 40 encloses the switching elements and which includes an outwardly-biased plunger 44, and a lever 46 which is pivoted within body 40. Lever 46 is formed as shown and engages plunger 44 which is normally in the outward position with the circuit open, and as shown in FIG. 7. A cylindrical pad 48 of magnetically-attracted material is provided with a co-axial shank 50 which is fixed integrally to lever 46, so as to position pad 48 co-axially with respect to magnets 24 when switch 38 is actuated to a closed position as shown in FIGS. 5 and 6.

Switch 38 is provided with terminal lugs 52 and 54. Leads 56 and 58 are soldered to lugs 52 and 54, respectively, and comprise the circuit shown diagrammatically as at 60. Leads 58 and 62 lead to the power source. Lead 62 also comprises one lead connected to motor M. A main switch of the conventional type, and indicated at 64, and not otherwise shown, is employed to break the circuit when the slicer is not in use or when it is being serviced. A lead 66 completes the circuit from switch 64 to motor M. Thus when switch 64 is closed, motor M is controlled solely by switch 38. With cover 14 closed and latched as in FIGS. 1, 2, 3 and 5, the magnetic field of magnets 24 will have attracted pad 48 to a position in contact with the bottom face of counterbore 30, and as shown in FIG. 5. In this position, and with switch 64 closed, switch 38 will also be closed, and motor M will rotate rotor 20. If cover 14 should be opened as shown in FIG. 4, the magnetic field of magnets 24 will no longer attract pad 48, and spring-loaded plunger 44 will pivot lever 46 to the position shown in FIG. 7, thus breaking the circuit and stopping motor M.

Figure 5:
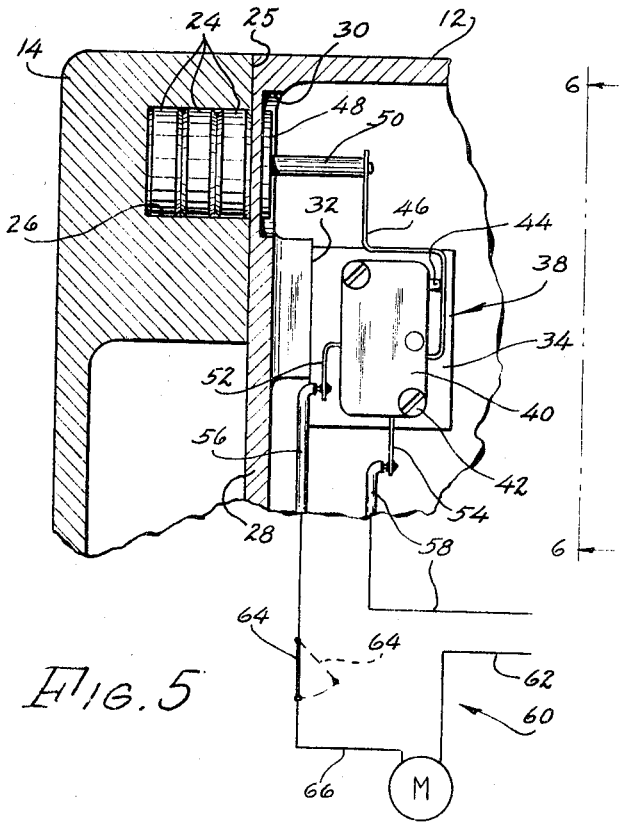
FIG. 5 is a section taken at 5—5 of FIG. 3, and showing the switch actuated to a closed position.

In order to assure that the switch 38 will be actuated to a "closed" position when cover 14 is closed, it is important that magnets 24 have a magnetic field of sufficient strength to attract and hold pad 48 in the position shown in FIG. 5. However, this field should not be excessive but should be of such magnitude that the circuit will be interrupted when a slight opening of the cover occurs, to prevent injury to the operator if the fingers should be accidentally inserted between the cover and frame 12, and be contacted by the rotating slicer blade 22.

It will be clear that this invention provides a means of preventing injury to an operator if the cover 14 should be accidentally opened. It also assures that the motor will not operate when the cover 14 is open for the purpose of servicing the slicer. This invention provides a means of breaking the circuit, which means is situated entirely behind the wall 28, with no openings that would admit food juices that would foul the switching mechanism and cause it to perform erratically. Such positioning assures that the switch and circuit will not encourage tampering therewith.

The above, being a complete description of an illustrative embodiment of the invention, what is claimed as new and desired to be secured by Letters Patent of the United States is:

1. In a food slicer having a motor, and comprising a frame having a front wall defined by laterally-spaced first and second edges and a front face and a rear face, a cover hinged to said frame at said first edge and having a front surface positionable into and out of proximity with respect to said front face and extending laterally and coextensively with said front wall, means to make-and-break the circuit of said motor comprising a cylindrical magnet positioned in said cover co-planar with said surface and with the axis thereof substantially normal to said surface, a switch in said frame adjacent said second edge and positioned rearwardly of said rear face and comprising a cylindrical, magnetically-attracted member positioned rearwardly of said rear face during the normally-open position of said switch, said member integral with a lever on said switch, and being brought into proximity with said rear face by the attraction of said magnet, to close said circuit upon the positioning of said front surface of said cover into proximity with said front face said magnet and said magnetically-attracted member being mutually co-axial when said front face of said frame and said front surface of said cover are in substantial mutual engagement, and said switch is in a closed-circuit position.

References Cited

UNITED STATES PATENTS

| | | | |
|---|---|---|---|
| 1,424,407 | 8/1922 | Helske | 200—50.1 |
| 2,511,464 | 6/1950 | Cover | 146—84 |
| 2,924,682 | 2/1960 | Winterburn | 200—61.62 |
| 3,391,718 | 7/1968 | Cooke et al. | 146—81 |

ROBERT K. SCHAEFER, Primary Examiner

M. GINSBURG, Assistant Examiner

U.S. Cl. X.R.

146—84